(12) United States Patent
Ullman et al.

(10) Patent No.: US 7,859,845 B2
(45) Date of Patent: Dec. 28, 2010

(54) PHASE CHANGE MATERIAL COOLING SYSTEM

(75) Inventors: Alan Zachary Ullman, Northridge, CA (US); Clyde D. Newman, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 154 days.

(21) Appl. No.: 12/337,913

(22) Filed: Dec. 18, 2008

(65) Prior Publication Data

US 2010/0157525 A1   Jun. 24, 2010

(51) Int. Cl.
*H05K 7/20* (2006.01)
*F28F 7/00* (2006.01)
*F28D 15/00* (2006.01)

(52) U.S. Cl. ................. 361/699; 165/80.4; 165/104.33; 361/700

(58) Field of Classification Search ........................ None
See application file for complete search history.

(56) References Cited

U.S. PATENT DOCUMENTS

| | | | |
|---|---|---|---|
| 5,443,115 A * | 8/1995 | Pedersen et al. ............... | 165/70 |
| 6,536,511 B1 * | 3/2003 | Nilsson et al. ............... | 165/113 |
| 7,106,777 B2 | 9/2006 | Delgado, Jr. et al. | |
| 7,669,643 B2 * | 3/2010 | Ekelund et al. ............... | 165/114 |
| 2003/0116302 A1 * | 6/2003 | Sauciuc et al. ................. | 165/10 |
| 2005/0082037 A1 * | 4/2005 | Thayer et al. ............... | 165/80.4 |
| 2006/0278382 A1 * | 12/2006 | Bhatti et al. ................. | 165/152 |
| 2007/0199687 A1 * | 8/2007 | Richter ........................ | 165/153 |
| 2008/0179039 A1 * | 7/2008 | Moilala et al. .................. | 165/4 |
| 2009/0260781 A1 * | 10/2009 | Ullman et al. .......... | 165/104.21 |

* cited by examiner

*Primary Examiner*—Gregory D Thompson
(74) *Attorney, Agent, or Firm*—Yee & Associates, P.C.; Kevin G. Fields

(57) ABSTRACT

A cooling system may comprise an array of plates, an array of channels, a conduit system, and a phase change material. The array of channels may have a number of a first type of channels alternating with a number of a second type of channels. The conduit system may be capable of circulating coolant through the number of the first type of channels. The phase change material may be located within the number of the second type of channels.

21 Claims, 5 Drawing Sheets

PHASE CHANGE MATERIAL COOLING SYSTEM

BACKGROUND INFORMATION

1. Field

The present disclosure relates generally to cooling systems and, in particular, to a method and apparatus for cooling a heat source. Still more particularly, the present disclosure relates to a method and apparatus for cooling a heat source using a phase change material in a cooling system.

2. Background

Various components in an aircraft may generate heat and require cooling. For example, without limitation, line replaceable units and other components in an aircraft network may require cooling to maintain those components at an appropriate operating temperature. These types of components may generate heat constantly.

Other components in the aircraft may generate heat on a non-constant basis. These types of components may generate heat based on an event that may be periodic or non-periodic. For example, without limitation, directed energy weapons that may be carried as a payload may generate heat when those weapons are used. The heat generated may be a large amount of heat over a short period of time. With these and other components, it may be desirable to provide required cooling for a lowest possible weight.

A number of conventional heat-exchangers exist that may be used as phase change heat exchangers. A shell and tube heat-exchanger may be an example, which is in widespread use for a wide variety of working fluids and in a large range of sizes owing to its scalability. Although this type of cooling system may be low cost, the weight and size of a conventional shell-and-tube heat-exchanger may limit its feasibility for airborne applications in which low mass and/or weight may be important. Using this type of heat-exchanger may increase the weight of the aircraft to an unacceptable level. Further, the required weight reduction may only be achieved by reducing the weight of other components, such as the payload.

A shell-and-tube heat exchanger may not provide effective thermal transfer to and from a phase change material (PCM) which may be of relatively low thermal conductivity, which may be the case for many aqueous and non-aqueous materials that may be conveniently used as a phase change material. These limitations may be addressed by the use of materials such as reticulated open-cell foam metal, but incorporation into a shell-and-tube topology may be difficult. More advantageous geometries for foam metal may be possible, but the foam metal medium may represent a mass addition to the overall system.

Therefore, it would be advantageous to have a method and apparatus that overcomes one or more of the issues described above.

SUMMARY

In one advantageous embodiment, a cooling system may comprise an array of plates, an array of channels formed between the array of plates, a conduit system, and a phase change material. The array of channels may have a number of a first type of channels alternating with a number of a second type of channels. The conduit system may be capable of circulating coolant through the number of the first type of channels. The phase change material may be located within the number of the second type of channels.

In another advantageous embodiment, an electric component cooling apparatus may comprise an array of plates, an array of channels, a first conduit system, a second conduit system, a phase change material, a seal, a heat source, and a platform. The array of channels may have a number of a first type of channels alternating with a number of a second type of channels. Each hollow plate of the array of channels may have a first opening, a second opening, a third opening, and a fourth opening to form a first array of openings, a second array of openings, a third array of openings, and a fourth array of openings. The first conduit system may be capable of circulating coolant through the number of the first type of channels. The first conduit system may be in communication only with an interior of the number of the first type of channels, wherein the coolant is water. The second conduit system may be in communication only with an interior of the number of the second type of channels. The first conduit system may comprise one of the first array of openings and the second array of openings in the first type of channels in communication with each other a first plurality of gaskets in communication with the first type of channels through the first array of openings and the second array of openings. The second conduit system may comprise one of the third array of openings and the fourth array of openings in the first type of channels in communication with each other and a second plurality of gaskets in communication with the second type of channels through the third array of openings and the fourth array of openings. The phase change material may be located within the number of the second type of channels. The phase change material may be selected from one of paraffin wax, a eutectic, and hydrogen peroxide and water. The seal may be located around each opening in the first array of openings and the second array of openings for the number of the second type of channels to prevent communication of an interior of the number of the second type of channels with the first conduit system. The seal may be one of a gasket and an o-ring seal. The heat source may be connected to the first conduit system. The heat source may be selected from one of a laser, a particle accelerator, a microwave generator, and an x-ray machine. The array of channels, the first conduit system, and the heat source may be located on the platform.

In yet another advantageous embodiment, a method may be present for cooling a coolant. The coolant may be circulated to a cooling system that may comprise an array of plates, an array of channels, and a conduit system. The array of channels may have a number of a first type of channels alternating with a number of a second type of channels. The conduit system may be capable of circulating the coolant through the number of the first type of channels. A phase change material may be located within the number of the second type of channels. The coolant may be cooled with the phase change material.

In a further another advantageous embodiment, a method may be present for cooling a coolant. The coolant may be circulated to a cooling system that may comprise an array of plates, an array of channels, and a conduit system. The array of channels may have a number of a first type of channels alternating with a number of a second type of channels. A conduit system may be capable of circulating the coolant through the number of the first type of channels. A phase change material may be located within the number of the second type of channels. The coolant may be water and the phase change material may be selected from one of paraffin wax, a eutectic, and hydrogen peroxide and water. The coolant may be cooled with the phase change material. The coolant cooled with the phase change material may be sent to a heat source, wherein the coolant cools the heat source.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
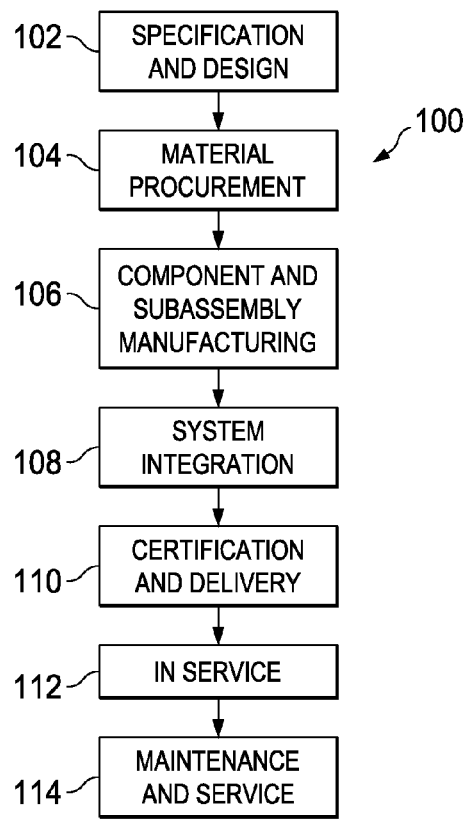
FIG. 1 is a diagram illustrating an aircraft manufacturing and service method in accordance with an advantageous embodiment.
Figure 2:
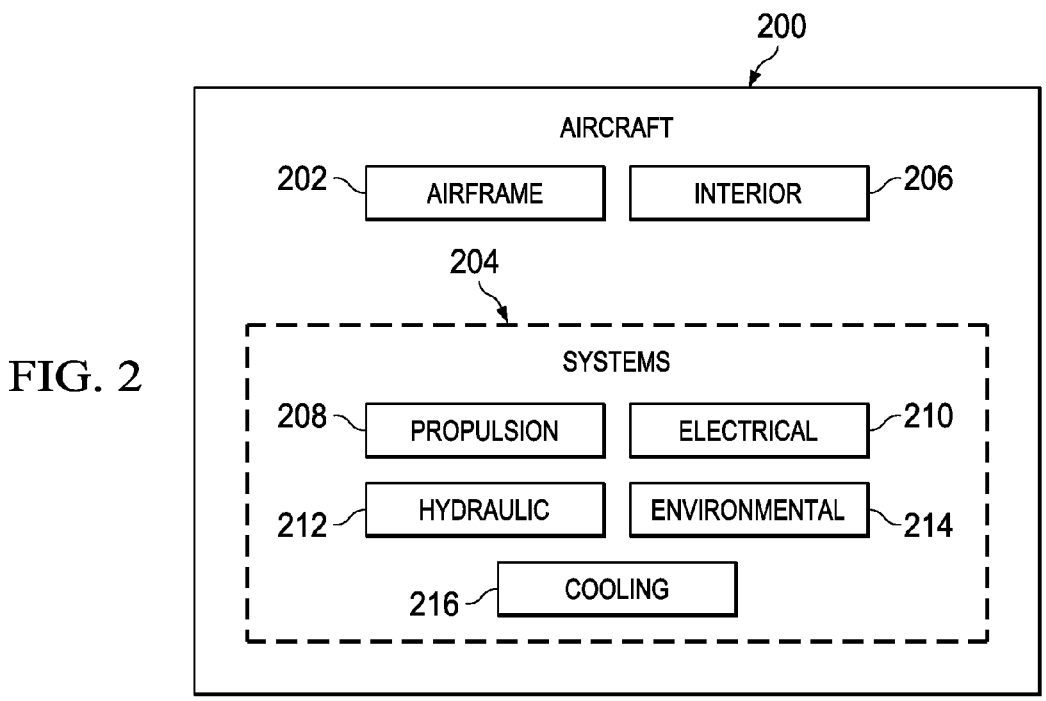
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2.

Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206.

Examples of systems 204 include one or more of propulsion system 208, electrical system 210, hydraulic system 212, environmental system 214, and cooling system 216. Cooling system 216 may be implemented using an advantageous embodiment. Any number of other systems may be included, in these illustrative examples. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, a cooling system, in accordance with an advantageous embodiment, may be manufactured during component and subassembly manufacturing 106 in FIG. 1. This cooling system may be implemented during system integration 108 in FIG. 1. Further, a cooling system, according to different advantageous embodiments, also may be manufactured and installed during maintenance and service 114 in FIG. 1. The cooling system may be used during service 112 in FIG. 1.

The different advantageous embodiments recognize and take into account that the use of phase change materials may provide a capability to employ lighter weight cooling systems. A phase change material may be a substance with a heat of fusion in which melting or solidifying at selected temperatures may absorb and/or release energy.

Heat may be absorbed when the material changes from a solid to a liquid, and heat may be released when the material changes from a liquid to a solid. Phase change materials may be referred to as latent heat-storage units. Closely spaced metal webs may be interspersed through the phase change material. These metal webs may be, for example, without limitation, foamed metal. The different advantageous embodiments recognize and take into account that this type of architecture may be expensive and hard to manufacture.

Thus, the different advantageous embodiments may provide a method and apparatus for cooling heat sources. A cooling apparatus may have an array of channels, a conduit system, and a phase change material. The array of channels may have a number of a first type of channels alternating with a number of a second type of channels. A number, as used herein, when referring to items, refers to one or more items. For example, without limitation, a number of the first type of channels may be one or more of the first type of channels.

The number of the first type of channels may alternate with the number of the second type of channels. In other words, the array of channels may contain a first type of channel next to a second type of channel, which may be next to a first type of channel in an alternating fashion. Further, the first type of channels may be in thermal contact with the second type of channels. The conduit system may be capable of circulating coolant through the number of the first type of channels. The phase change material may be located within the number of the second type of channels.

Figure 3:
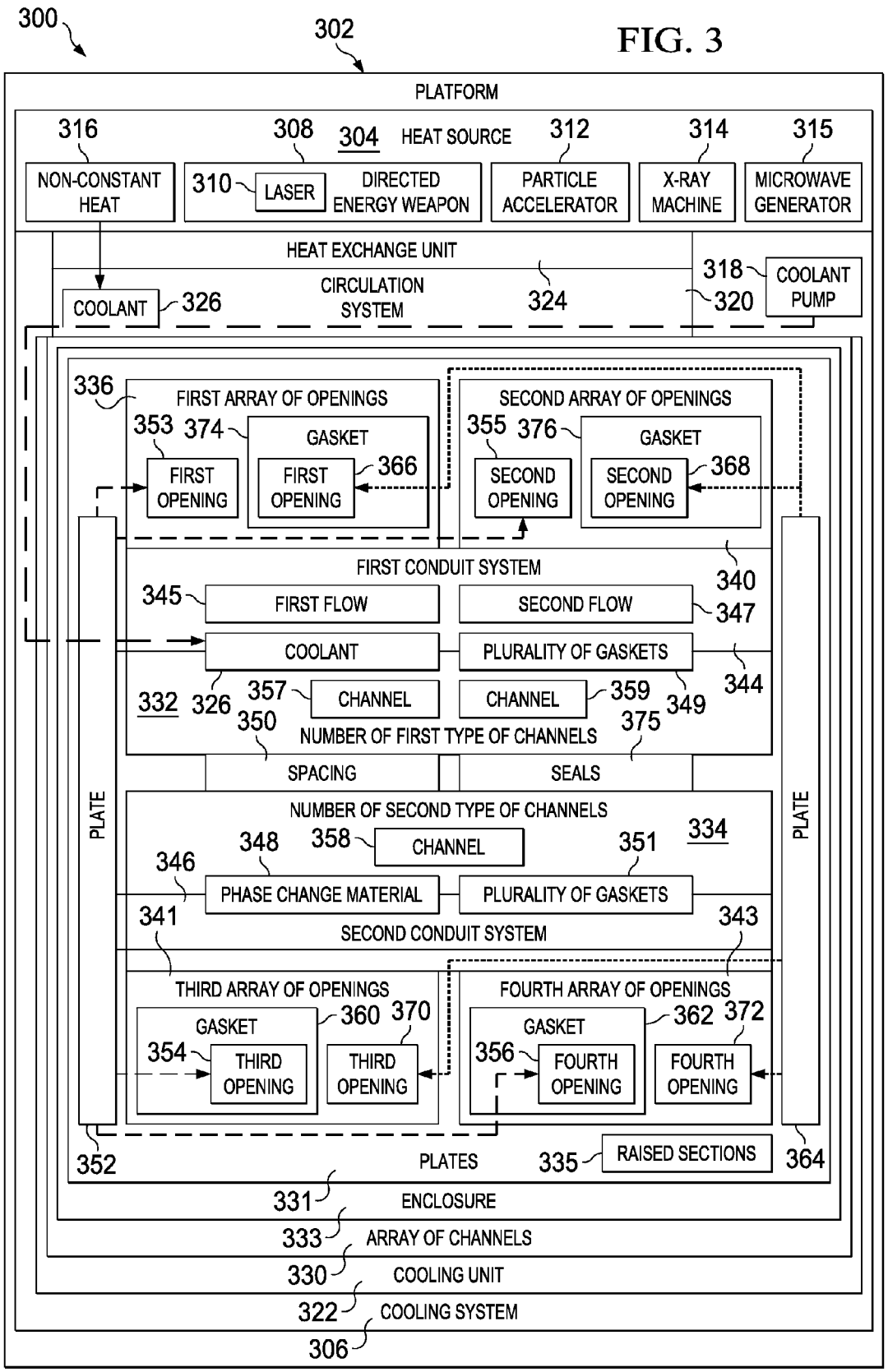
FIG. 3 is a diagram of a cooling environment in accordance with an advantageous embodiment.

With reference now to FIG. 3, a diagram of a cooling environment is depicted in accordance with an advantageous embodiment. Cooling apparatus 300 may include platform 302, on which heat source 304 and/or cooling system 306 may be located. Platform 302 may be, for example, without limitation, aircraft 200 in FIG. 2.

Heat source 304 may take various forms. For example, without limitation, heat source 304 may be directed energy weapon 308. An example of directed energy weapon 308 may be laser 310. Additionally, heat source 304 also may take other forms. Other heat sources may be, for example, without limitation, parasitic loads associated with a directed energy device, power conversion subsystems, motive drivers in the cooling system, electric actuators, sensors, and/or other suitable devices or heat sources.

For example, without limitation, heat source 304 may be particle accelerator 312, x-ray machine 314, microwave generator 315, and/or some other suitable heat source.

In these examples, heat source 304 may generate non-constant heat 316. Non-constant heat 316 may be generated whenever heat source 304 is operated.

Cooling system 306 may be an example of an implementation for cooling system 216 in aircraft 200 in FIG. 2. Cooling system 306 may include coolant pump 318, circulation system 320, cooling unit 322, and heat exchange unit 324.

Coolant pump 318 may pump coolant 326 through circulation system 320 between cooling unit 322 and heat exchange unit 324. Heat exchange unit 324 may be connected to or otherwise in contact with heat source 304. Heat exchange unit 324 may generate non-constant heat 316 from heat source 304 to heat coolant 326. Non-constant heat 316 may be any form of heat such as, for example, without limitation, radiant heat and/or some other suitable form of heat. Coolant 326 may flow to cooling unit 322, which may cool coolant 326.

In these examples, coolant 326 may take the form of water. Coolant 326 may be liquids including, but not limited to, water, aqueous solutions of ethylene or propylene glycol, chloro-fluorocarbons including Freons®, fluorocarbons and other inert fluids, heat transfer fluids composed of largely or entirely of hydrocarbons, and silicone oils, synthetic oils, and/or other suitable liquids. In some advantageous embodiments, coolant 326 may also take the form of, without limitation, a gas or vapor, and/or some other suitable form.

In these examples, cooling unit 322 may have array of channels 330 formed between plates 331. Plates 331 may have various shapes and may have raised sections 335 to control spacing between plates 331. For example, plates 331 may be rectangular, circular, triangular, hexagonal, or some other suitable shape. Plates 331 may have a planar surface, a non-planar surface, and/or some other type of surface. In addition, in other advantageous embodiments, plates 331 may be concentric circular plates enclosing array of channels 330. Further, plates 331 may be thin laminar structures.

Array of channels 330 may have a number of first type of channels 332 and a number of second type of channels 334 between plates 331. These two types of channels may be substantially parallel to each other and may be alternating such that one type of channel is adjacent to a different type of channel. These channels may be configured such that the channels may be in thermal contact with each other. In other words, the number of second type of channels 334 may transfer heat to the number of first type of channels 334. This transfer of heat may occur through a common plate within plates 331 between array of channels 330.

Cooling unit 322 also may have first conduit system 344 and second conduit system 346. First conduit system 344 may connect number of first type of channels 332 within array of channels 330 using plurality of gaskets 349. Second conduit system 346 may connect number of second type of channels 334 within array of channels 330 using plurality of gaskets 351. In these examples, first conduit system 344 may be capable of circulating coolant 326 through number of first type of channels 332. Phase change material 348 may be located in the number of second type of channels 334. Second conduit system 346 may be capable of introducing phase change material 348 into number of second type of channels 334 in these examples.

In these illustrative examples, plates 331 may have seals 375 around plates 331 to form enclosure 333 around array of channels 330. Seals 375 may be for example, without limitation, rubber gaskets, raised sections of plates 331, welded joints, brazed joints, and/or some other suitable type of seal.

In these different advantageous embodiments, array of channels 330 may all be the same size and shape. In some advantageous embodiments, array of channels 330 may be spaced apart from each other by spacing 350, which may be a thickness of seals 375. Spacing 350 may be, for example, without limitation, around one millimeter to around two millimeters. In some advantageous embodiments, spacing 350 may be the thickness of raised sections 335 for plates 331.

Plates 331 may have first array of openings 336, second array of openings 340, third array of openings 341, and fourth array of openings 343. First array of openings 336, second array of openings 340, third array of openings 341, and fourth array of openings 343 may each be an array of openings substantially collinear to each other.

Further, in these illustrative examples, first array of openings 336 and second array of openings 340 may provide access to first conduit system 344 for the circulation of coolant 326. For example, first array of openings 336 may allow first flow 345 of coolant 326 through first conduit system 344 from one channel to another within number of first type of channels 332. In a similar manner, second array of openings 340 may allow second flow 347 of coolant 326 through first conduit system 344. In these illustrative examples, first flow 345 and second flow 347 through first conduit system 344 may be flow of coolant 326 in opposite directions.

In these illustrative examples, third array of openings 341 and fourth array of openings 343 may provide access to second conduit system 346. In other advantageous embodiments, different arrays of openings may provide access to first conduit system 344 and/or second conduit system 346. For example, in some other advantageous embodiments, first array of openings 336 and third array of openings 341 may provide access to first conduit system 344, while second array of openings 340 and fourth array of openings 343 may provide access to second conduit system 346.

In these examples, first conduit system 344 may comprise plurality of gaskets 349, and second conduit system 346 may comprise plurality of gaskets 351. Plurality of gaskets 349 and plurality of gaskets 351 may be seals such as, for example, O-ring seals, and/or some other suitable gasket or seal.

Plurality of gaskets 349 may prevent coolant 326 in number of first type of channels 332 from mixing with phase change material 348 in number of second type of channels 334. In a similar manner, plurality of gaskets 351 may prevent phase change material 348 in number of second type of channels 332 from mixing with coolant 326 in number of first type of channels 334. Plurality of gaskets 349 and plurality of gaskets 351 may be present on alternating plates within plates 331.

In these illustrative examples, plate 352 and plate 364 may be examples of plates within plates 331. Plate 352 and plate 364 may be used to implement a number of first type of channels 332 and/or a number of second type of channels 334 within array of channels 330. In these illustrative examples, plate 352 may be placed adjacent to plate 364 to form channel 358.

Channel 358 may be one example of a channel within number of first type of channels 334 and may have phase change material 348 located in channel 358. Plate 352 may also serve as one wall for forming channel 357, and plate 364 may serve as one wall for forming channel 359. Channels 357 and 359 may be examples of channels within number of first type of channels 332 and may contain coolant 326 circulated by first conduit system 344.

Plate 352 may have first opening 353 and second opening 355. First opening 353 may be an opening in first array of openings 336 and second opening 355 may be an opening in second array of openings 340. First opening 353 and second opening 355 may be in communication with channel 357 and coolant 326. Plate 352 may also have third opening 354, which may be an opening in third array of openings 341, and fourth opening 356, which may be an opening in fourth array of openings 343. Third opening 354 and fourth opening 356 may be in communication with channel 358 and phase change material 348.

Plate 364 may have first opening 366, second opening 368, third opening 370, and fourth opening 372. First opening 366 may be an opening within first array of openings 336 and may be collinear to first opening 353. Second opening 368 may be an opening within second array of openings 340 and may be collinear to second opening 355. Third opening 370 may be an opening within third array of openings 341 and may be collinear to third opening 354. Fourth opening 372 may be an opening within fourth array of openings 343 and may be collinear to fourth opening 356.

In these illustrative examples, gaskets 360 and 362 may be gaskets within plurality of gaskets 351 for second conduit system 344. Gaskets 360 and 362 may be placed around third opening 354 and fourth opening 356 on plate 352. Gaskets 360 and 362 may prevent phase change material 348 in channel 358 from communicating with coolant 326 in channel 357. Further, gaskets 374 and 376 may be gaskets within plurality of gaskets 349 for first conduit system 344. Gaskets 374 and 376 may be placed around first opening 366 and second opening 368 on plate 364. Gaskets 374 and 376 may prevent coolant 326 in channels 357 and 359 from communicating with phase change material 348, while coolant 326 may circulate through first conduit system 344.

For example, coolant 326 in channel 357 may flow along with first flow 345 in first conduit system 344 through first opening 353 of plate 352 and into a portion of first conduit system 344 sealed by gasket 374 around first opening 366 in plate 364. Coolant 326 may then flow through first opening 366 of plate 364 and into channel 359 without having communicated with phase change material 348 in channel 358.

As another example, coolant 326 in channel 359 may flow along with second flow 347 in first conduit system 344 through plate 364 through a portion of first conduit system 344 sealed by gasket 376 around second opening 368 and into channel 357 through second opening 355 in plate 352. In this manner, coolant 326 may not mix with phase change material 348 in channel 358.

As yet another example, phase change material 348 may be located in channel 358 and may be in communication with number of second type of channels 334 using second conduit system 346. Phase change material 348 may have been introduced into channel 358 through third opening 354 and/or fourth opening 356 in plate 352, and/or third opening 370 and/or fourth opening 372 in plate 364.

In these examples, plates 352 and 364 may be constructed from a variety of different types of materials. The particular material selected may be one that may allow for the exchange or conduction of heat through plates 352 and 364. For example, without limitation, plate 352 may be comprised of aluminum, steel, stainless steel, copper, plastic, and/or some other suitable material.

In these advantageous embodiments, plates 352 and 364 may be, for example, without limitation, around one millimeter to around two millimeters thick. The width and length of plates 352 and 364 may vary depending on the particular implementation. For example, without limitation, plates 352 and 364 may be one meter by one meter, one meter by three meters, or some other suitable dimension.

In these illustrative examples, phase change material 348 may change from a solid phase to a liquid phase when absorbing heat. Phase change material 348 may be implemented using a number of different types of phase change materials, depending on the particular embodiment. The phase change material selected may depend on the type of cooling required.

Phase change material 348 may take various forms. For example, without limitation, phase change material 348 may be an organic material, an inorganic material, and/or a eutectic. For example, without limitation, phase change material 348 may take the form of water, paraffin wax, aqueous and non-aqueous brines, eutectics, such as a hydrogen peroxide and water mix, and/or some other suitable phase change material.

Melting points for the different forms for phase change material 348 may include, for example, without limitation, around 0 degrees Celsius for water, around 47 degrees Celsius to 64 degrees Celsius for paraffin wax, and around −56 degrees Celsius for a hydrogen peroxide and water eutectic mixture.

In the different advantageous embodiments, array of channels 330 may provide for heat exchange between coolant 326 and phase change material 348. With the use of array of channels 330, a larger surface area may be provided as compared to other types of heat exchange systems.

The illustration of cooling apparatus 300 in FIG. 3 is not meant to imply physical or architectural limitations to the manner in which different advantageous embodiments may be implemented. For example, without limitation, some embodiments may have other components in addition to or in place of the ones illustrated. Further, some components may be unnecessary in other embodiments.

In some advantageous embodiments, cooling system 306 may have a number of cooling units in addition to cooling unit 322. Also, in some advantageous embodiments, heat source 304 may be multiple heat sources of the same type or different types. In yet other advantageous embodiments, a similar process to the process implemented in cooling apparatus 300 may be implemented for a heating apparatus. The heating apparatus may have a phase change material such as, for example, without limitation, phase change material 348. In this example, phase change material 348 may change from a liquid phase to a solid phase when releasing heat.

Figure 4:
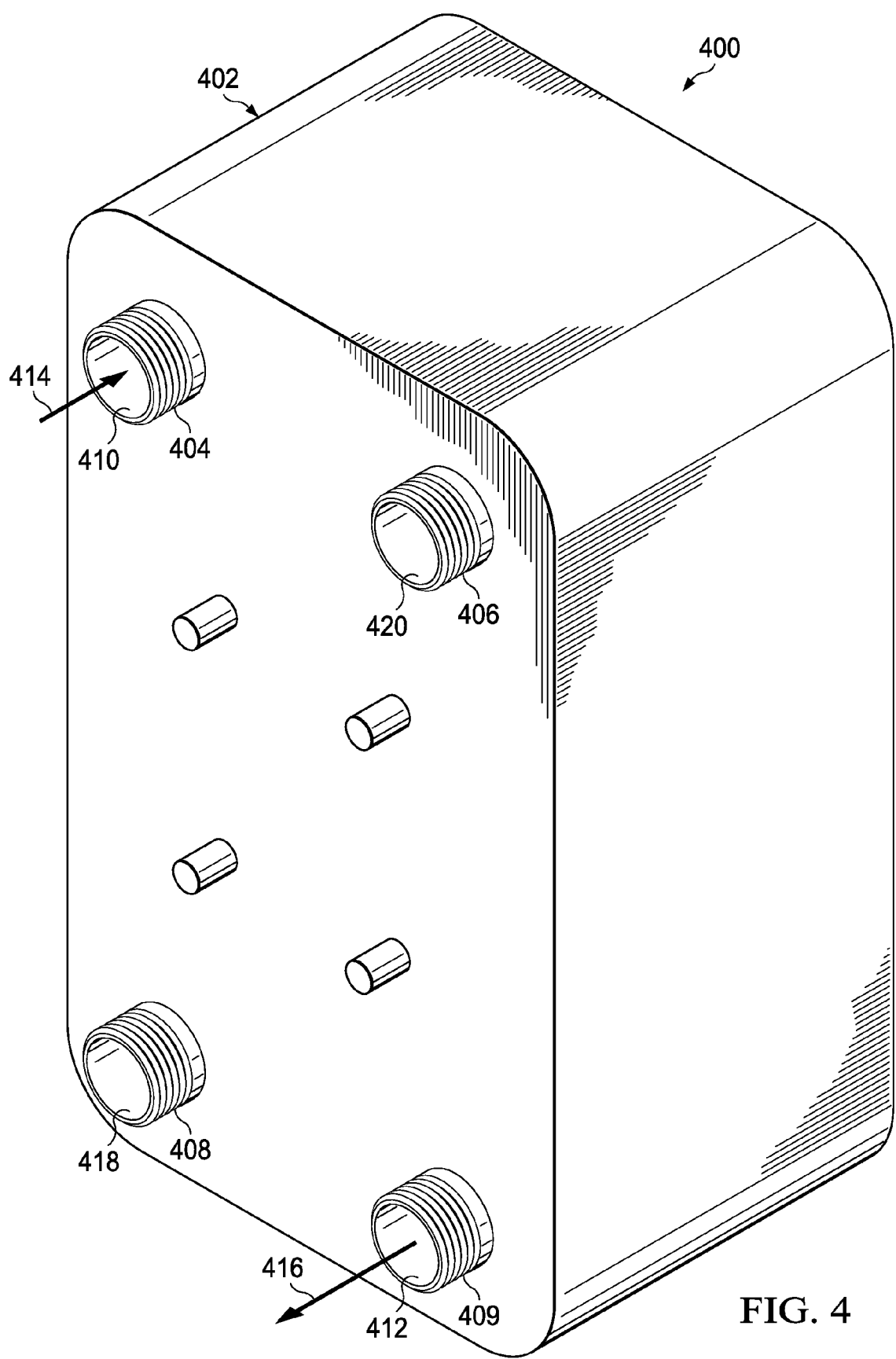
FIG. 4 is a diagram of a perspective view of a cooling unit in accordance with an advantageous embodiment.

With reference now to FIG. 4, a diagram of a perspective view of a cooling unit is depicted in accordance with an advantageous embodiment. In this example, cooling unit 400 may be an example of one implementation for cooling unit 322 in FIG. 3. Cooling unit 400 has housing 402. Housing 402 has first conduit system 404, second conduit system 406, third conduit system 408, and fourth conduit system 409.

First conduit system 404 may circulate coolant 326 in FIG. 3 into opening 410 of first conduit system 404 and out of opening 412 of fourth conduit system 409 in the direction of arrows 414 and 416, respectively. Of course, the flow of coolant 326 may be reversed depending on the particular implementation. Phase change material 348 may be introduced at opening 418 of third conduit system 408 and/or opening 420 of second conduit system 406.

Cooling unit 400 may be implemented using a cooling unit such as, for example, without limitation, a channel and frame heat-exchanger available from Polaris Channel Heat Exchangers.

Figure 5:
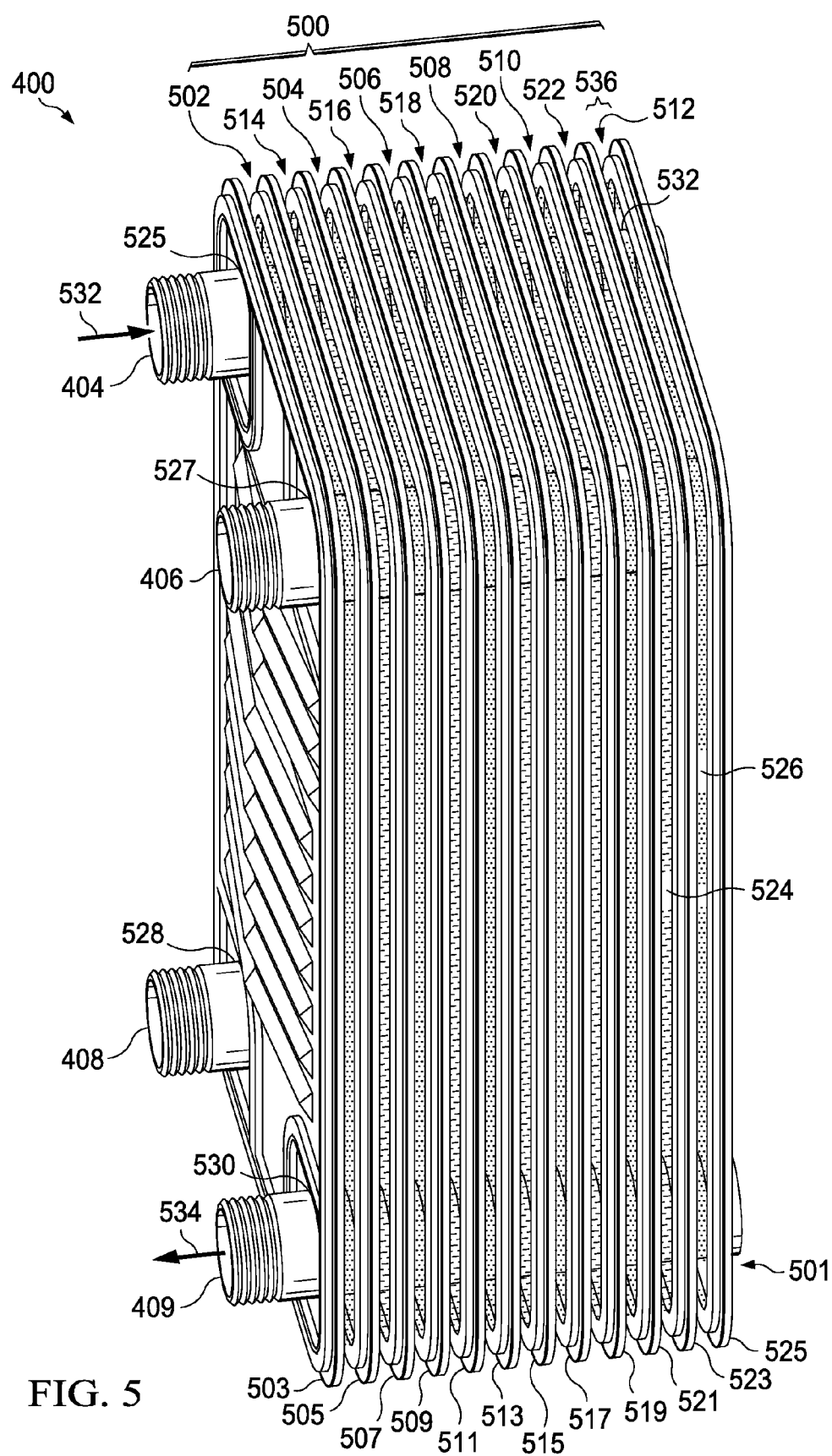
FIG. 5 is an exposed view of a cooling unit in accordance with an advantageous embodiment.

Turning next to FIG. 5, an exposed view of a cooling unit is depicted in accordance with an advantageous embodiment. In this exposed view of cooling unit 400, array of channels 500 may be present. In this example, array of channels 500 may be an example of one implementation for array of channels 330 in FIG. 3.

Array of channels 500 may be formed between plates 501. In these examples, plates 501 may include plates 503, 505, 507, 509, 511, 513, 515, 517, 519, 521, 523 and 525. Array of channels 500 may have a number of first type of channels 502, 504, 506, 508, 510, and 512. Array of channels 500 also may include a number of second type of channels 514, 516, 518, 520, and 522.

As can be seen, array of channels 500 may alternate between a first type of channel and a second type of channel in these examples. The number of first type of channels 502, 504, 506, 508, 510, and 512 may circulate coolant 526, while the number of second type of channels 514, 516, 518, 520, and 522 may contain phase change material 524. Array of channels 500 may have first opening 525, second opening 527, third opening 528, and fourth opening 530.

First conduit system 404 may have a first flow in the direction of arrow 532, while fourth conduit system 409 may have a second flow in the direction of arrow 534. First flow 532 and second flow 534 may course through array of channels 500. In these illustrative examples, first conduit system 404 and fourth conduit system 409 may be used to circulate coolant 526 in array of channels 500.

In these examples, array of channels 500 may have width 536. Width 536 may be selected to provide a desired exchange of heat between coolant 526 and phase change material 524. Further, width 536 may be determined by a thickness of a plurality of gaskets used for first conduit system 404, second conduit system, 406, third conduit system 408, and fourth conduit system 409. The plurality of gaskets has not been included in FIG. 5 to avoid obscuring the illustration of the channel. Of course, in other advantageous embodiments, each channel in array of channels 500 may have varying widths.

In these illustrative examples, plates 501 may have seals enclosing array of channels 500 to prevent the escape of coolant 526 and phase change material 524. These seals have not been shown to avoid obscuring the illustration of the channels.

Figure 6:
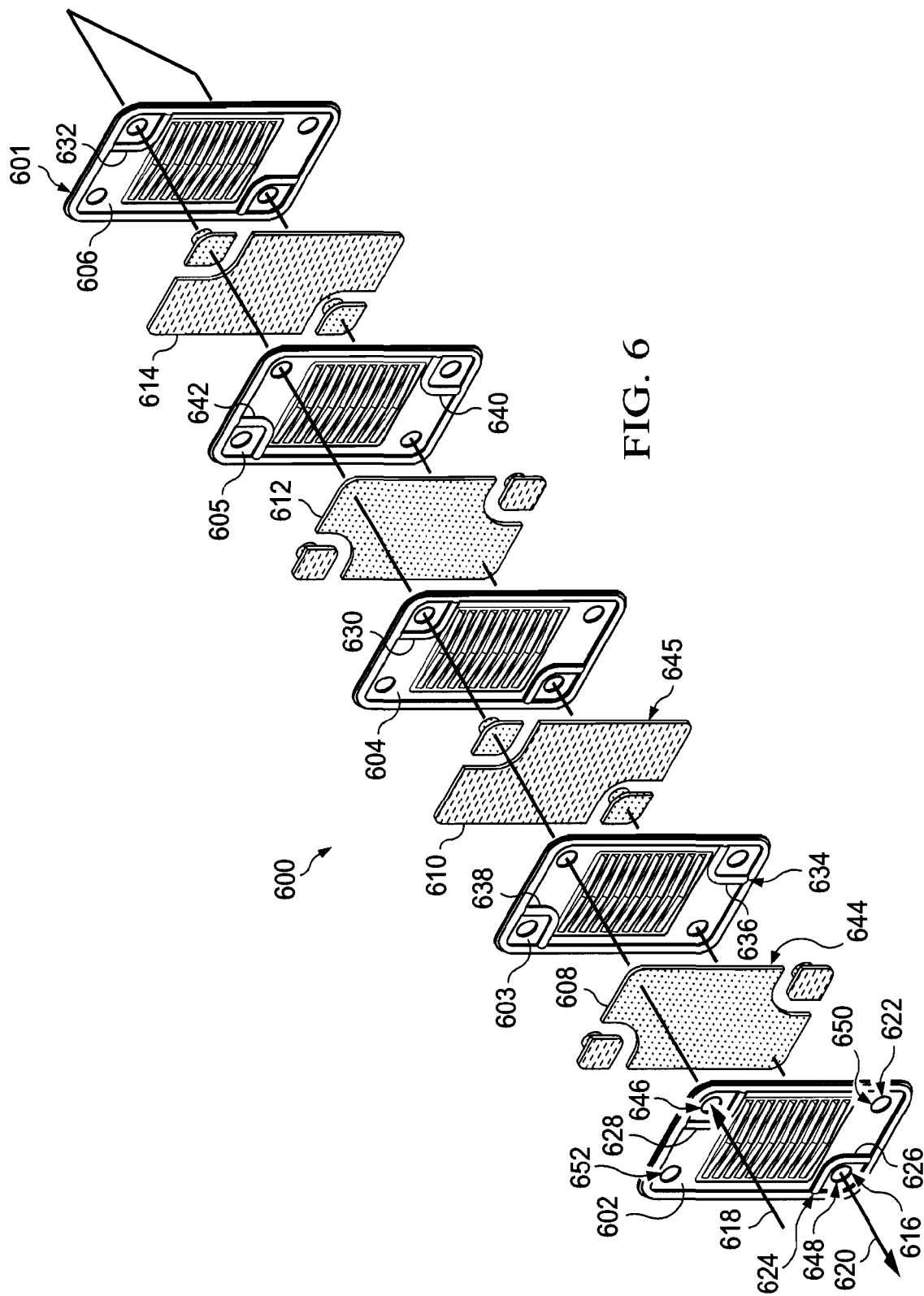
FIG. 6 is an exposed view of an array of channels in accordance with an advantageous embodiment.

With reference next to FIG. 6, a diagram of an exposed view of an array of channels is depicted in accordance with an advantageous embodiment. Array of channels 600 with plates 601 may be an example of array of channels 330 with plates 331 in FIG. 3.

Plates 601 may include plate 602, plate 603, plate 604, plate 605, and plate 606. Channel 608 may be formed by plates 602 and 603. Channel 610 may be formed by plates 603 and 604. Channel 612 may be formed by plates 604 and 605. Channel 614 may be formed by plates 605 and 606. Channels 608 and 612 may be examples of channels within number of first type of channels 332 in FIG. 3. Channels 610 and 614 may be examples of channels within number of second type of channels 334 in FIG. 3.

In these illustrative examples, array of channels 600 may have first conduit system 616 with first flow 618 and second flow 620 in opposite directions. Array of channels 600 may also have second conduit system 622. First conduit system 616 may have plurality of gaskets 624. Plurality of gaskets 624 may include gaskets 626, 628, 630, and 632 on plates 602, 604, and 606.

Plurality of gaskets 624 may also include gaskets on plates 604 and 606, which may not be seen in this view of array of channels 600. Second conduit system 622 may have plurality of gaskets 634. Plurality of gaskets 634 may include gaskets 636, 638, 640, and 642 on plates 603 and 605.

First conduit system 616 may circulate coolant 644 through first conduit system 616. Coolant 644 may pass through first array of openings 646 in first conduit system 616 with first flow 618 sealed by gasket 628 into channel 608. Further, coolant 644 may pass through second array of openings 648 through first conduit system 616 with second flow 620 sealed by gasket 626 into another channel within array of channels 600 or out of the cooling unit, which may be a cooling unit such as, for example, without limitation, cooling unit 322. In this manner, coolant 644 may circulate through channels 608 and 612 and through first conduit system 616 sealed by plurality of gaskets 624 without mixing with phase change material 645 in channels 610 and 614.

Further, phase change material 645 may be introduced and/or stored in channels 610 and 614 by second conduit system 622. Phase change material 645 may be prevented from mixing with coolant 644 when passing through channels 608 and 612 by plurality of gaskets 634. In these examples, second conduit system 622 may use third array of openings 650 and fourth array of openings 652 in plates 601. First array of openings 646, second array of openings 648, third array of openings 650, and fourth array of openings 652 in plates 601 may each be an array of openings substantially collinear to each other.

Other gaskets may interconnect plates in these examples. Other advantageous embodiments may use other mechanisms other than plates. For example, without limitation, permanent sealing mechanisms including welding and brazing plates may be used.

Figure 7:
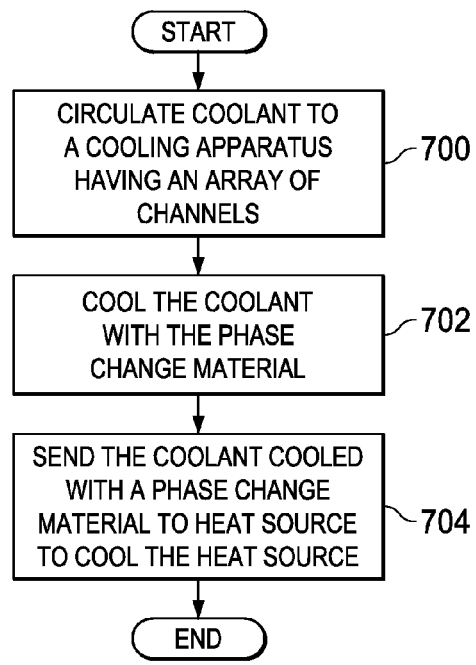
FIG. 7 is a flowchart of a process for cooling a coolant in accordance with an advantageous embodiment.

With reference now to FIG. 7, a flowchart of a process for cooling a coolant is depicted in accordance with an advantageous embodiment. The process illustrated in FIG. 7 may be implemented using a cooling environment such as, for example, without limitation, cooling apparatus 300 in FIG. 3.

The process may begin by circulating coolant 326 to cooling apparatus 300 having array of channels 330 (operation 700). Array of channels 330 may have number of first type of channels 332 alternating with number of second type of channels 334. Cooling apparatus 300 may also have first conduit system 344 capable of circulating coolant 326 through number of first type of channels 332. Phase change material 348 may be located in number of second type of channels 334. The process may cool coolant 326 with phase change material 348 (operation 702). Coolant 326 cooled with phase change material 348 may be then sent to heat source 304 to cool heat source 304 (operation 704), with the process terminating thereafter.

Thus, the different advantageous embodiments may provide a method and apparatus for cooling a heat source. The different advantageous embodiments may provide a capability to cool a heat source using a cooling system that may take up less space as compared to other currently available cooling systems. The different advantageous embodiments may require fewer components than currently used systems and thin laminar plates may be used. For example, without limitation, fins and/or foam metals may not be needed.

Further, the different advantageous embodiments may employ the use of a phase change material that may be capable of cooling the coolant for heating sources that may operate on a non-continuous manner. The channel configuration between plates may provide a capability to place the cooling system in narrow cavities or passages as compared to other cooling systems. These narrow passages may provide improved heat transfer and/or dissipation due to the fewer components required for the cooling apparatus and the thinness and laminar structure of the plates.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A cooling system comprising:
   an array of plates;
   an array of channels formed between the array of plates and having a number of a first type of channels alternating with a number of a second type of channels, wherein the number of the first type of channels are in thermal contact with the number of the second type of channels;
   a conduit system capable of circulating coolant through the number of the first type of channels; and
   a phase change material located within the number of the second type of channels.

2. The cooling system of claim 1, wherein the conduit system is in communication with an interior of the number of the first type of channels.

3. The cooling system of claim 1, wherein the conduit system is a first conduit system and further comprising:
   a second conduit system, wherein the second conduit system is in communication with an interior of the number of the second type of channels.

4. The cooling system of claim 1, wherein each channel of the array of channels has a first opening, a second opening, a third opening, and a fourth opening to form a first array of openings, a second array of openings, a third array of openings, and a fourth array of openings.

5. The cooling system of claim 4, wherein the conduit system comprises the first array of openings and the second array of openings in the first type of channels in communication with each other.

6. The cooling system of claim 4, wherein the conduit system comprises a plurality of gaskets in communication with the first type of channels through the first array of openings and the second array of openings.

7. The cooling system of claim 6 further comprising:
   a seal located around each of a number of openings in the first array of openings and the second array of openings for the number of the second type of channels to prevent communication of an interior of the number of the second type of channels with the conduit system.

8. The cooling system of claim 7, wherein the seal is one of a gasket and an o-ring seal.

9. The cooling system of claim 1, wherein the phase change material is selected from one of paraffin wax, aqueous brines, non-aqueous brines, eutectics, hydrogen peroxide, and water.

10. The cooling system of claim 1, wherein the coolant is water.

11. The cooling system of claim 1 further comprising:
    a heat source connected to the conduit system.

12. The cooling system of claim 11, wherein the heat source is selected from one of a laser, a microwave generator, a particle accelerator, and an x-ray machine.

13. The cooling system of claim 11 further comprising:
    a platform, wherein the array of plates, the array of channels, the conduit system, and the heat source are located on the platform.

14. The cooling system of claim 13, wherein the platform is selected from one of a mobile platform, a stationary platform, a land-based structure, an aquatic-based structure, a space-based structure, a submarine, a bus, a personnel carrier, a tank, a train, an automobile, a spacecraft, a space station, a satellite, a surface ship, a power plant, a dam, a manufacturing facility, a building.

15. An electrical component cooling apparatus comprising:
    an array of plates;
    an array of channels formed between the array of plates and having a number of a first type of channels alternating with a number of a second type of channels, wherein each channel of the array of channels has a first opening, a second opening, a third opening, and a fourth opening to form a first array of openings, a second array of openings, a third array of openings, and a fourth array of openings;
    a first conduit system capable of circulating coolant through the number of the first type of channels, wherein the first conduit system is in communication only with an interior of the number of the first type of channels; wherein the first conduit system comprises one of the first array of openings and the second array of openings in the number of the first type of channels in communication with each other and a first plurality of gaskets in communication with the number of the first type of channels through the first array of openings and the second array of openings; and wherein the coolant is water;
    a second conduit system, wherein the second conduit system is in communication only with an interior of the number of the second type of channels, and wherein the second conduit system comprises the third array of openings and the fourth array of openings in the number of the second type of channels in communication with each other and a second plurality of gaskets in communication with the second type of channels through the third array of openings and the fourth array of openings;

a phase change material located within the number of the second type of channels, wherein the phase change material is selected from one of paraffin wax, a eutectic, and hydrogen peroxide and water;

a seal located around each opening in the first array of openings and the second array of openings for the number of the second type of channels to prevent communication of an interior of the number of the second type of channels with the second conduit system, wherein the seal is one of a gasket and an o-ring seal;

a heat source connected to the first conduit system, wherein the heat source is selected from one of a laser, a particle accelerator, and an x-ray machine; and a platform, wherein the array of plates, the array of channels, the first conduit system, and the heat source are located on the platform.

16. The electrical component cooling apparatus of claim 15, wherein the platform is selected from one of a mobile platform, a stationary platform, a land-based structure, an aquatic-based structure, a space-based structure, a submarine, a bus, a personnel carrier, a tank, a train, an automobile, a spacecraft, a space station, a satellite, a surface ship, a power plant, a dam, a manufacturing facility, a building.

17. A method for cooling a coolant, the method comprising:

circulating the coolant to a cooling system comprising an array of plates, an array of channels formed between the array of plates and having a number of a first type of channels alternating with a number of a second type of channels; a conduit system capable of circulating the coolant through the number of the first type of channels; and a phase change material located within the number of the second type of channels; and cooling the coolant with the phase change material.

18. The method of claim 17 further comprising:

sending the coolant cooled with the phase change material to a heat source, wherein the coolant cools the heat source.

19. The method of claim 17, wherein the phase change material is selected from one of a paraffin wax, an aqueous brine, a non-aqueous brine, and a eutectic, and hydrogen peroxide and water.

20. The method of claim 17, wherein the coolant is water.

21. A method for cooling a coolant, the method comprising:

circulating the coolant to a cooling system comprising an array of plates, an array of channels formed between the array of plates and having a number of a first type of channels alternating with a number of a second type of channels; a conduit system capable of circulating the coolant through the number of the first type of channels; and a phase change material located within the number of the second type of channels, wherein the coolant is water and wherein the phase change material is selected from one of paraffin wax, a eutectic, and hydrogen peroxide and water;

cooling the coolant with the phase change material; and sending the coolant cooled with the phase change material to a heat source, wherein the coolant cools the heat source.

* * * * *